United States Patent
Stelzer

[15] 3,695,732
[45] Oct. 3, 1972

[54] PRESSURE MODULATING DEVICE FOR USE IN ANTI-SKID BRAKE SYSTEM

[72] Inventor: William Stelzer, Bloomfield Hills, Mich.

[73] Assignee: Kelsey-Hayes Company

[22] Filed: Jan. 12, 1970

[21] Appl. No.: 1,968

Related U.S. Application Data

[63] Continuation of Ser. No. 592,688, Oct. 20, 1966, abandoned.

[52] U.S. Cl. ............303/21 F, 188/181 A, 188/345, 303/6 C, 303/10, 303/61
[51] Int. Cl. ..........................B60t 8/12, B60t 8/26
[58] Field of Search ..........303/21, 10, 6, 6 C, 61–63, 303/68–69; 188/152, 152.11, 181

[56] References Cited

UNITED STATES PATENTS 3,093,422  6/1963  Packer et al.
3,301,608  1/1967  Harned et al. ..............303/21
3,322,471  5/1967  Faiver et al. ...............303/21
3,512,844  5/1970  Stelzer .....................188/181 X Primary Examiner—Milton Buchler
Assistant Examiner—John J. McLaughlin
Attorney—Harness, Dickey & Pierce

[57] ABSTRACT

A pressure proportioning and control mechanism for the fluid supplied to the cylinders of the brakes at the front and rear wheels of a vehicle, the mechanism including a proportioning device having a plunger and adapted to reduce the pressure on the rear wheels relative to the front wheels as the master cylinder pressure is increased, a piston on the plunger, a cylinder for the piston having an inlet and outlet port, means including a source of actuating fluid ancillary to the brake actuating fluid and responsive to a rapid deceleration of a wheel to rapidly reduce the braking pressure thereon, and a solenoid valve controlling the flow of fluid between the ports.

11 Claims, 2 Drawing Figures

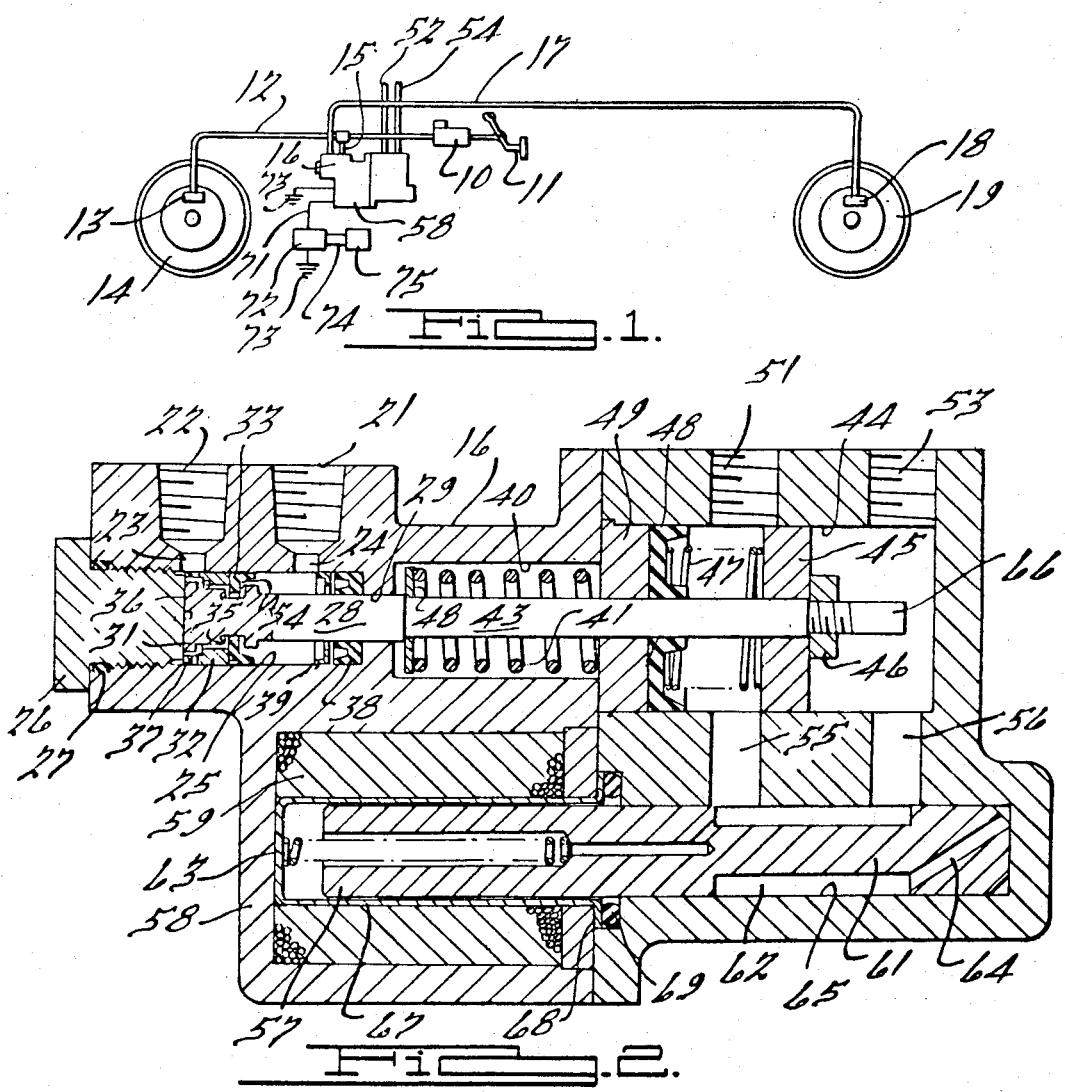

PRESSURE MODULATING DEVICE FOR USE IN ANTI-SKID BRAKE SYSTEM

This application is a continuation application of U.S. application, Ser. No. 592,688, filed Oct. 20, 1966, now abandoned.

According to the present invention a master cylinder applies pressure to the rear brakes of the vehicle and to a booster which increases the pressure on the front brakes. Initially, until the force of a spring is overcome, the same pressure is applied to the front and rear brakes. As the pressure of the master cylinder increases the spring yields to close the passage to the front brake cylinder and shift the plunger to increase the pressure on the fluid thereof. This same structure is employed in the present invention, the plunger which moves the valve to close the passage and which is engaged by the spring has a piston on the end thereof within a cylinder which receives fluid on one side from a power steering return line and which is returned to tank on the other side of the piston. The fluid circuit about the piston includes a valve for closing off the return passageway thereby building up pressure on the pressure side of the piston which moves the plunger to advance the valve and seal in the proportioning device to further reduce the pressure on the rear brakes. The proportioning valve either increases the pressure on the cylinders of the front wheel brakes or decreases the pressure on the cylinder of the rear wheel brakes depending on which of the two ports is employed as the intake port. The weight due to braking concentrates the load force more and more on the front wheels and reduces that on the rear wheel so that the rear wheel will lose traction and tend to swing relative to the front wheels.

The use of the piston on the plunger, the fluid to which is controlled by a solenoid operated valve, is effective to rapidly reduce the pressure on the rear brakes or increase that on the front brakes. By having the valve solenoid operated, the coil may be energized through the operation of a magnetic pickup which senses a skid condition. A skid condition will be sensed when the rear wheels are rapidly decelerated due to the loss of traction and the brake pressure being applied thereto. When the sensing device is employed with an electric device which responds to a rapid change in frequency, resulting from the excessive deceleration of the rear wheels, a current will be applied to the solenoid coil. This will immediately operate the valve closing off the fluid flow past the rear side of the piston which will be moved to the rear by the pressure built up on the front side thereof. The resulting rapid movement of the plunger to the right will quickly reduce the pressure on the fluid in the cylinder of the rear brakes which will permit the wheels to pick up traction with the road surface. Should skidding continue, a series of alternate apply and release cycles will occur to the rear brakes until the vehicle stops or the wheels again have traction with the road surface.

Accordingly, the main objects of the invention are: to provide a proportioning valve which operates from a signal from a device sensing a skid to reduce the pressure on the cylinders of the brake of the rear wheels; to connect a fluid actuated piston to the plunger of a proportioning device and apply fluid pressure thereto in response to a sensing device upon the occurrence of a skid by the rear wheels; to employ a magnetic pickup which operates in combination with an electronic device which supplies a current to the coil of a solenoid which closes a valve and causes a fluid to move a piston and plunger which substantially reduces the fluid pressure on the brakes of the rear wheel, and in general, to provide a control for the fluid pressure on the rear wheel brakes when a skid occurs which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

FIG. 1 is a schematic view of a brake system embodying features of the present invention, and FIG. 2 is a sectional view of the pressure control device of the system illustrated in FIG. 1.

In FIG. 1, a master cylinder 10 has the pressure on the hydraulic fluid therein applied by a foot pedal 11. The pressure of the fluid passes through a conduit 12 to cylinders 13 of the brakes on the front wheels 14. Fluid from a branch conduit 15 is delivered to a proportioning device 16. Fluid from the proportioning device passes through a conduit 17 to a cylinder 18 of each brake of the rear wheels 19. As illustrated in FIG. 1, the proportioning device 16 has an inlet port 21 connected to the conduit 15 and an outlet port 22 connected to the conduit 17. The ports 21 and 22 communicate through passageways 23 and 24 to a cylindrical bore 25. The left-hand end of the bore, as viewed in the Figure, has a plug 26 threaded therein and sealed thereto by an O-ring 27. A plunger 28 passes through an aperture 29 at the end of the bore 25 and extends through a cylindrical aperture 40.

The end of the plunger 28 adjacent to the plug 26 has an enlarged head 31 located within a sleeve 32 the end of which engages an elastomeric seal 33. The seal extends within an annular recess 34 in the wall of the plunger which has an annular rib 35 for closing the opening through the center of the seal when the plunger moves to the right. When this occurs, a shoulder 36 on the head 31 engages a shoulder 37 on the sleeve 32 to have the plunger and sleeve advance as a unit. The plunger 28 is sealed within the bore 25 by a seal 38 retained in the end of the bore by a collar 39. The aperture 29 in the end wall of the bore communicates with a cylindrical bore 40 containing a spring 41, one end of which engages the bottom of the bore, the other end of which engages a washer 42 which abuts a shoulder formed by an extension 43 of the plunger 28. The extension passes within a cylinder 44 and is connected to a piston 45 by a nut 46. The piston is urged against the nut by a spring 47 which retains a sealing element 48 against the end wall 49 of the cylinder 44. An inlet port 51 has a conduit 52 connected thereto from the power steering return line. An outlet port 53 has a conduit 54 connected thereto which forms a return line to the power steering tank. The cylinder 44 has an outlet passageway 55 and an inlet passageway 56 on opposite sides of the piston 45.

An armature 57 of a solenoid 58 has a coil 59 and a valve portion 61 containing an annular recess 62 which spans the passageways 55 and 56. The valve portion 61 is urged to the right, as illustrated in FIG. 2, by a spring 63. The right-hand end of the valve has a passage-way 64 to prevent the fluid from being trapped in the end of the bore 65 in which the valve operates. When the coil 59 is energized, the armature 57 is moved to the left moving the annular recess 62 to the left sufficiently to shut off the passageway 56 from the passageway 55. When this occurs, the piston 45 moves to the right to substantially reduce the pressure on the fluid at the outlet port 22 and the cylinders 13 of the brakes for the rear wheels 14. The movement of the piston 45 to the right is limited by the extending end 66 when engaging the right-hand wall of the cylinder 44. A shell 67 of nonmagnetic material such as brass, aluminum and the like, encloses the armature 57 and is provided with a flange 68 which is sealed by an O-ring 69. It will be noted in FIG. 1 that the solenoid 58 is connected by a conductor 71 to an electronic device 72, both of which are grounded at 73. The electronic device 72 is connected by conductors 74 to a magnetic pickup device 75 known in the art and available in the trade. The devices 72 and 75 cooperate to energize the coil 59 of the solenoid 58. The operation of the proportioning device 16 will now be described. The magnetic pickup device 75 generates electric current impulses whose frequencies are proportional to the speed of rotation of the vehicle wheel. The electronic circuit device 72 responds to a rapid change in frequency resulting from excessive deceleration of the vehicle wheel and completes a circuit through the conductor 71 to the solenoid coil 59. This moves the armature 57 and valve 61 to the left, closing the passageway 56 and causing the fluid from the port 51 to move the piston 45 to the right which moves the plunger 28 and seal 33 further to the right, removing pressure from the outlet port 22 and substantially reducing the rear brake pressure on the rear wheels. Each time the rear wheels lose traction with the road surface and are rapidly decelerated by the brakes, the magnetic pickup device will respond to release the pressure on the rear brakes and permit the tires to again have traction engagement with the road surface. The elimination of the skid condition returns the magnetic pickup device to normal condition and the electronic device immediately responds to deenergize the coil 59. With the increased pressure reapplied to the fluid in the cylinders of the rear wheel brakes, the skid condition may reoccur resulting in the energization of solenoid 59 and the reduction in the pressure on the rear brake cylinder and the reapplication of the pressure to the brakes thereafter may result in the occurrence of a series of alternate cycles until the vehicle stops or the brake application versus road adhesion is not as severe. As indicated above when making reference to the cylinders of the brakes for the rear wheel, it is to be understood that the structure herein illustrated and described applies to the rear wheel braking system. A similar device and arrangement can be used for the brakes of the front wheels. In this arrangement the pressure applied to the fluid in the cylinders of the front wheel brakes is substantially increased over that applied to the rear wheel brake system and a similar result obtains.

The present arrangement proportions the pressure applied to the front and rear brake cylinders after the same pressure is applied to both up to the time it overcomes the force of a spring. Thereafter, a greater relative pressure is applied to the front wheel brake cylinders for the purpose of reducing the possibility of a skid occurring, especially to the rear wheels. Should a skid occur, to the rear wheels for example, the brakes will rapidly decelerate the wheels and the magnetic pickup device resulting in the rapid reduction in pressure on the fluid in the cylinders for the rear wheel brakes. Thus the device has a dual function, the first to prevent skidding, and the second to relieve the skidding condition upon its occurrence.

I claim:

1. In a pressure proportioning and control device for the fluid supplied to the cylinders of the brakes at the front and rear wheels of the vehicle, a proportioning device including a pressure modulating valve member for controlling the relative fluid pressure supplied to the front and rear wheels as the master cylinder pressure is increased, said device including a housing having a first port communicable with a master cylinder and a second port communicable with a brake cylinder, fluid passageway means communicating said ports, a plunger movable within said passageway for actuating said valve member, means including a source of actuating fluid ancillary to the brake actuating fluid and responsive to a rapid deceleration of a wheel at one end of the vehicle to rapidly reduce the braking pressure thereon, a piston means for effecting longitudinal movement of said plunger within said passageway for controlling operation of said valve member in response to preselected fluid pressure conditions of said ancillary fluid, and means including a second valve member responsive to an electrical control signal for controlling the application of said ancillary fluid to said piston.

2. In a device as recited in claim 1, wherein pressure is applied to one of the sets of brakes of the front and rear wheels directly from the master cylinder without any proportioning thereof.

3. In a skid control system for controlling fluid pressure actuated brakes of at least one wheel of a wheeled vehicle, a device including a first control valve for proportioning the fluid pressure supplied from a source of brake actuating fluid to the brakes, said device including a housing having a first port communicable with a master cylinder and a second port communicable with a brake cylinder, fluid passageway means communicating said ports, a plunger movable within said passageway for actuating said valve member, a source of pressurized hydraulic fluid ancillary to the source of brake actuating fluid and provided by the vehicle engine for relieving the pressure of the brake actuating fluid supplied to the brakes in response to said output signal, fluid operated piston means effecting operation of said plunger, and a second control valve movable within a cylinder communicable with said passageway on the opposite sides of said piston means and responsive to an electrical control signal for controlling application of said ancillary fluid to the opposite sides of said piston means.

4. A skid control system as defined in claim 3 which includes engine operated pump means for providing said source of ancillary pressurized hydraulic fluid.

5. In a pressure proportioning and control device for the fluid supplied to the cylinders of the brakes at the front and rear wheels of the vehicle, a proportioning device, said device including a housing having a first port communicable with a master cylinder and a second port communicable with a brake cylinder, fluid passageway means communicating said ports, a pressure modulating member having a plunger and adapted to proportion the fluid pressure supplied to the front and rear wheels as the master cylinder pressure is increased, a piston on said plunger and reciprocable within said passageway said piston means effecting longitudinal movement of said plunger within said passageway, means including a source of actuating fluid ancillary to the brake actuating fluid and responsive to a rapid deceleration of a wheel at one end of the vehicle to rapidly reduce the braking pressure thereon, and a solenoid valve responsive to an electrical control signal for controlling the application of said ancillary fluid to said piston.

6. In a device as recited in claim 5, wherein a magnetic pickup device on at least one wheel at one end of the vehicle has its output frequency changed upon the rapid deceleration of the wheel rotation.

7. In a device as recited in claim 6, wherein electronic means responsive to said change in frequency causes said solenoid to be energized.

8. In a pressure proportioning and control device for the fluid supplied to the cylinders of the brakes at the front and rear wheels of the vehicle, a proportioning device including a pressure modulating valve means for reducing the pressure on the rear wheels relative to the front wheels as the master cylinder pressure is increased, said proportioning device including a housing provided with an inlet port communicable with a master cylinder, an outlet port communicable with a brake cylinder, a passageway communicating said ports, a plunger in said passageway, spring means urging the plunger toward a position for maintaining the passageway between the inlet and outlet ports open, a piston on the end of the plunger within a cylinder, means including a source of actuating fluid ancillary to the brake actuating fluid and responsive to a rapid deceleration of a wheel at one end of the vehicle to rapidly reduce the braking pressure thereon, and a valve for causing fluid pressure to be applied to the piston for moving the plunger against the spring means for substantially reducing the pressure on the fluid in said brake cylinder.

9. In a device as recited in claim 8, wherein a solenoid operates said valve the energization of the coil of which moves the valve to produce the movement of the piston.

10. In a device as recited in claim 9, wherein a magnetic pickup device on at least one wheel at one end of the vehicle senses a rapid deceleration by a change in output frequency.

11. In a device as recited in claim 10, wherein electronic means responsive to said change in frequency causes the solenoid to be energized.

* * * * *